United States Patent
Kim (10) Patent No.: US 11,571,958 B2
(45) Date of Patent: Feb. 7, 2023

(54) ENGINE MOUNT FOR VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 392 days.

(21) Appl. No.: 16/929,895

(22) Filed: Jul. 15, 2020

(65) Prior Publication Data

US 2021/0309091 A1    Oct. 7, 2021

(30) Foreign Application Priority Data

Apr. 1, 2020 (KR) ................. 10-2020-0039520

(51) Int. Cl.
*B60K 5/12* (2006.01)
(52) U.S. Cl.
CPC .......... *B60K 5/1275* (2013.01); *B60K 5/1283* (2013.01); *B60Y 2306/09* (2013.01)
(58) Field of Classification Search
CPC ... B60K 5/1208; B60K 5/1283; B60K 5/1275
See application file for complete search history.

(56) References Cited

U.S. PATENT DOCUMENTS

| | | | | |
|---|---|---|---|---|
| 2016/0001648 A1* | 1/2016 | Kim | ...................... | F16F 13/002 248/566 |
| 2016/0138671 A1* | 5/2016 | Kim | ........................ | F16F 13/22 267/140.14 |
| 2016/0186830 A1* | 6/2016 | Furusawa | ............. | F16F 13/105 267/140.13 |
| 2016/0186831 A1* | 6/2016 | Furusawa | ............. | F16F 13/105 267/140.13 |
| 2016/0238103 A1* | 8/2016 | Kim | ...................... | B60K 5/1208 |
| 2017/0023088 A1* | 1/2017 | Kadowaki | ............. | F16F 13/105 |
| 2017/0122399 A1* | 5/2017 | Kim | ...................... | B60K 5/1208 |
| 2017/0152911 A1* | 6/2017 | Kim | ........................ | F16F 13/10 |
| 2018/0320753 A1* | 11/2018 | Beckmann | ........... | B60K 5/1208 |
| 2019/0016205 A1* | 1/2019 | Yoon | .................... | B60K 5/1208 |
| 2019/0017567 A1* | 1/2019 | Kim | ...................... | F16F 13/105 |
| 2019/0061509 A1* | 2/2019 | Kim | ...................... | F16F 13/262 |

(Continued)

FOREIGN PATENT DOCUMENTS

| | | |
|---|---|---|
| JP | 4861969 B2 | 1/2012 |
| JP | 4914817 B2 | 4/2012 |
| KR | 101676257 B1 | 11/2016 |

*Primary Examiner* — Jeffrey J Restifo
(74) *Attorney, Agent, or Firm* — Fox Rothschild LLP; Peter F. Corless (57) ABSTRACT

Disclosed is an engine mount for a vehicle including a membrane, which is an essential component of an engine mount for supporting a powertrain of the vehicle. The membrane may be deformed vertically and radially depending on an input amplitude so as to open or close bypass holes in upper and lower plates depending on the input amplitude. As such, it is possible to easily fulfill a function of isolating vibrations generated by the powertrain during idling and a damping function of controlling the behavior of the powertrain during traveling and it is possible to prevent the generation of abnormal noise attributable to cavitation and rattling phenomena.

11 Claims, 9 Drawing Sheets

(56) References Cited

U.S. PATENT DOCUMENTS

| | | | |
|---|---|---|---|
| 2019/0072152 A1* | 3/2019 | Kim | F16F 13/108 |
| 2019/0160931 A1* | 5/2019 | Kim | F16F 13/22 |
| 2019/0176605 A1* | 6/2019 | Ueki | F16F 13/10 |
| 2019/0248220 A1* | 8/2019 | Choi | B60K 5/1208 |
| 2020/0001695 A1* | 1/2020 | Kim | F16F 13/103 |
| 2020/0109759 A1* | 4/2020 | Beckmann | F16F 13/105 |
| 2020/0182326 A1* | 6/2020 | Kim | B60K 5/1291 |
| 2020/0391583 A1* | 12/2020 | Kim | B60K 5/1208 |
| 2021/0033167 A1* | 2/2021 | Ishikawa | F16F 13/107 |
| 2021/0061039 A1* | 3/2021 | Kim | B60K 5/1208 |
| 2021/0061084 A1* | 3/2021 | Ueki | F16F 13/101 |
| 2021/0300169 A1* | 9/2021 | Kim | B60K 5/1208 |
| 2021/0309091 A1* | 10/2021 | Kim | F16F 13/16 |
| 2021/0316603 A1* | 10/2021 | Kim | B60K 5/1283 |

* cited by examiner

ENGINE MOUNT FOR VEHICLE

CROSS-REFERENCE TO RELATED APPLICATION

This application claims under 35 U.S.C. § 119(a) the benefit of priority to Korean Patent Application No. 10-2020-0039520 filed on Apr. 1, 2020, the entire contents of which are incorporated herein by reference.

TECHNICAL FIELD

The present invention relates to an engine mount for a vehicle. The engine mount for a vehicle includes a membrane itself that may be deformed depending on an input amplitude so as to prevent the generation of abnormal noise attributable to cavitation and to enable the dynamic characteristics of the engine mount to be switched in a self-switchable manner.

BACKGROUND

Generally, in order to efficiently reduce vibration and noise transmitted to a vehicle body when an engine and a powertrain including a transmission are mounted in an engine room, the engine and the powertrain are mounted via an engine mount.

Engine mounts are classified into a fluid engine mount sealably containing fluid therein, a negative-pressure-type semi-active engine mount, an electronic semi-active engine mount and the like, and may be constructed into various structures other than the above-listed engine mounts.

Such an engine mount fulfills the functions of supporting a powertrain in an engine room of a vehicle, isolating vibrations generated by the powertrain and controlling the behavior of the powertrain during traveling of the vehicle.

Preferably, with regard to the dynamic characteristic and the damping value of the engine mount, it is advantageous to decrease the dynamic characteristic at a C2 frequency (generally, at a frequency of about 30 to 50 Hz) for isolation of vibration of the powertrain during idling, and it is advantageous to increase the damping value at 8 to 15 Hz for control of behavior of the powertrain during traveling.

To this end, a negative-pressure semi-active engine mount or an electronic semi-active mount is adopted as the engine mount for supporting the powertrain.

For reference, "negative-pressure semi-active engine mount" refers to a fluid engine mount that adopts a negative-pressure driver that is turned on or off depending on the traveling conditions so as to vary the dynamic characteristic, and the electronic semi-active engine mount refers to an engine mount, which is a fluid engine mount adopting an electronic driver which is turned on or off depending on the traveling conditions so as to vary the dynamic characteristic.

Although the semi-active engine mount advantageously switches between two types of dynamic characteristics depending on the traveling condition, there is a problem in that the manufacturing costs and weight thereof are increased because the negative-pressure driver or the electronic driver must be added.

Furthermore, a conventional engine mount exhibits a cavitation phenomenon in which negative pressure is formed in an upper fluid chamber due to rapid lifting of a core bush and a main rubber attributable to a great input amplitude, and air bubbles in the fluid in upper and lower fluid chambers expand and burst, and a rattling phenomenon, in which a speed with which fluid flows to an upper fluid chamber from a lower fluid chamber is increased and a membrane severely vibrates, with the result that abnormal noise is generated due to the cavitation phenomenon and the rattling phenomenon.

The above information disclosed in this Background section is only for enhancement of understanding of the background of the invention, and therefore it may contain information that does not form the prior art that is already known in this country to a person of ordinary skill in the art.

SUMMARY

In preferred aspect, provided is an engine mount for a vehicle, in which a membrane, which is an essential component of an engine mount for supporting a powertrain of the vehicle, may be itself deformed vertically and radially depending on an input amplitude so as to open or close bypass holes in upper and lower plates depending on the input amplitude. Thus, it is possible to easily fulfill a function of isolating vibrations generated by the powertrain during idling and a damping function of controlling the behavior of the powertrain during traveling and it is possible to prevent the generation of abnormal noise attributable to cavitation and rattling phenomena.

In one aspect, provided is an engine mount for a vehicle including a main rubber formed on an outer surface of a core bush to be assembled with a vehicle body, an outer pipe attached to an outer surface of the main rubber and extending downwards, an orifice body, which is provided at a circumference thereof with a main flow path for fluid communication between an upper fluid chamber and a lower fluid chamber and which is provided in a bottom surface thereof with a second passage hole, the orifice body being mounted on an inner surface of the outer pipe, a lower plate including a second fluid bypass hole formed in an outer peripheral portion thereof and integrally formed at an inner periphery of the orifice body, an upper plate, which includes a first fluid passage hole formed in an outer peripheral portion thereof so as to communicate with the main flow path, a first fluid bypass hole configured to communicate with the second fluid bypass hole and a fluid introduction hole formed in a center region thereof, the upper plate being coupled to an upper portion of the orifice body, a membrane, which includes a fluid action recess configured to be aligned with the fluid introduction hole and which includes a blocking plate configured to open and close the first fluid bypass hole and the second fluid bypass hole, the membrane being disposed in a space between the lower plate and the upper plate so as to be elastically deformed in a radial direction, and a diaphragm mounted on a lower portion of the orifice body so as to define the lower fluid chamber.

The membrane may include i) a fluid action plate defining the fluid action recess having a V-shaped cross section, ii) an elastic deformation plate integrally formed with the fluid action plate and obliquely extending downwards from an outer periphery of the fluid action plate, and iii) the blocking plate integrally formed with the elastic deformation plate and extending horizontally from an outer periphery of the elastic deformation plate so as to open and close the first fluid bypass hole and the second fluid bypass hole.

The blocking plate of the membrane may include therein a plurality of slits, which are circumferentially arranged at regular intervals.

The membrane may include a coupling protrusion formed at a lower surface of a center thereof, and the lower plate has a coupling hole formed in a center thereof, the coupling protrusion being fitted into the coupling hole.

The lower plate may include a fluid discharge hole formed outside the coupling hole such that fluid present between the membrane and the lower plate is discharged through the fluid discharge hole when the membrane is elastically deformed downwards.

The upper fluid chamber may be defined as a space between the main rubber and the upper plate, and the lower fluid chamber may be defined as a space between the orifice body, the lower plate, and the diaphragm.

When micro vibration including vibration during idling of the vehicle is applied to the engine mount, fluid communication between the upper fluid chamber and the lower fluid chamber may be implemented through the first fluid bypass hole in the upper plate and the second fluid bypass hole in the lower plate, which communicate with each other, while the membrane maintains an initial shape thereof.

When large vibration due to traveling of the vehicle is applied to the engine mount, fluid in the upper fluid chamber may act on the fluid action recess in the membrane through the fluid introduction hole in the upper plate, and the membrane may be elastically deformed radially downwards so as to close the first fluid bypass hole in the upper plate and the second fluid bypass hole in the lower plate, whereby fluid communication between the upper fluid chamber and the lower fluid chamber is implemented through the main flow path in the orifice body.

A peripheral portion of the diaphragm may be provided on an outer surface thereof with a rigidity-reinforcing plate attached thereto so as to reinforce rigidity of the diaphragm.

A bracket to be connected to an engine may be mounted on outer surfaces of the main rubber and the outer pipe.

A cover body may be mounted in a lower opening in the bracket so as to cover a lower portion of the diaphragm.

Other aspects of the invention are discussed infra.

The above and other features of the invention are discussed infra.

BRIEF DESCRIPTION OF THE DRAWINGS

The above and other features of the present invention will now be described in detail with reference to various exemplary embodiments thereof, illustrated in the accompanying drawings which are given hereinbelow by way of illustration only, and thus are not limitative of the present invention, and wherein.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments that may be included within the spirit and scope of the invention as defined by the appended claims.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof. Further, when a portion such as a layer, a film, a region, or a plate is referred to as being "above" the other portion, it may be not only "right above" the other portion, or but also there may be another portion in the middle. On the contrary, when a portion such as a layer, a film, a region, or a plate is referred to as being "under" the other portion, it may be not only "right under" the other portion, or but also there may be another portion in the middle.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative-fuel vehicles (e.g. fuels derived from resources other than petroleum). As referred to herein, a hybrid vehicle is a vehicle that has two or more sources of power, for example one powered by both gasoline and electricity.

Hereinafter, a preferred embodiment of the present invention will be described in detail with reference to the accompanying drawings.

Figure 1:
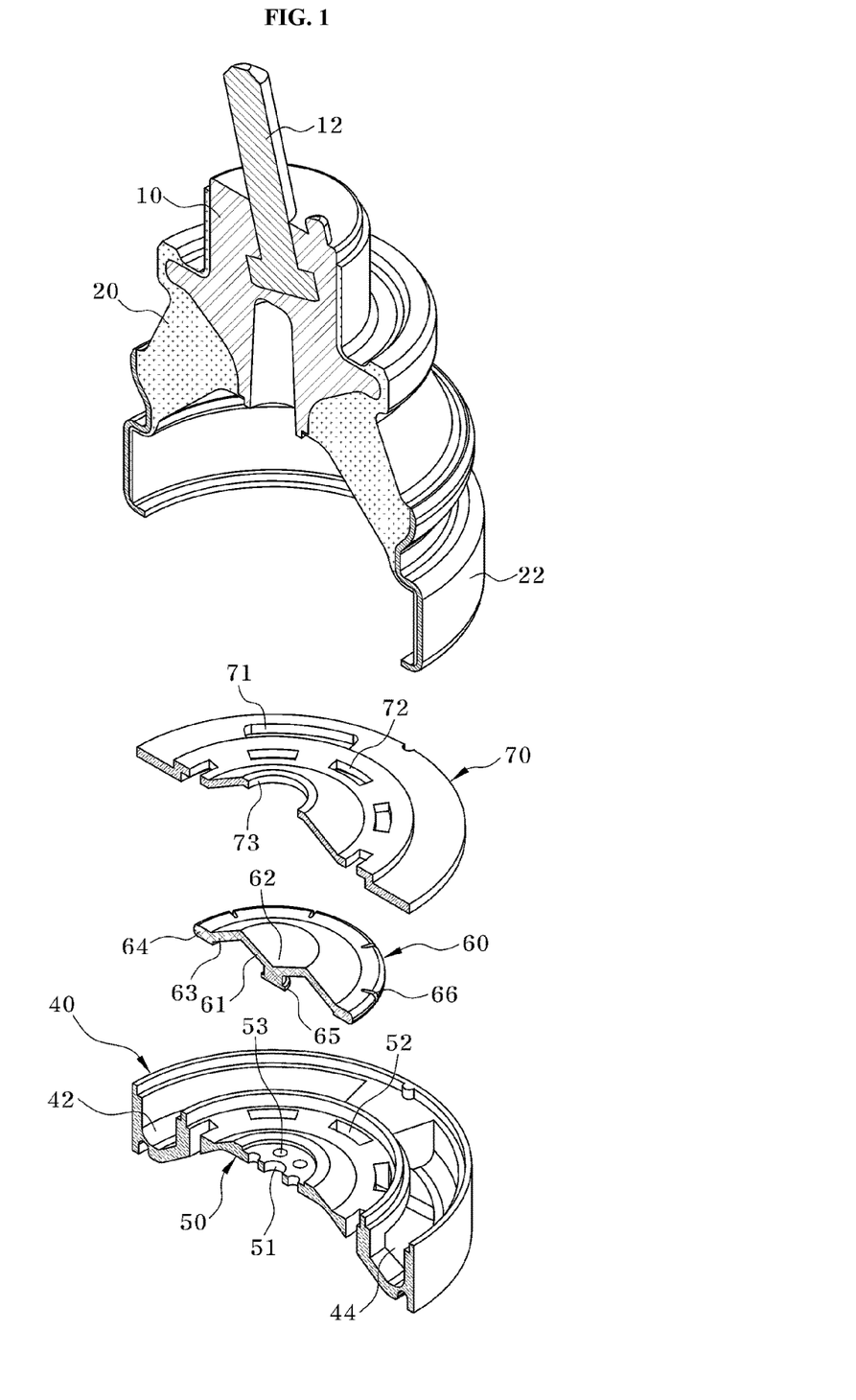
FIGS. 1 to 4 show various exemplary engine mounts for a vehicle according to exemplary embodiments and assembly processes of the present invention.
Figure 2:
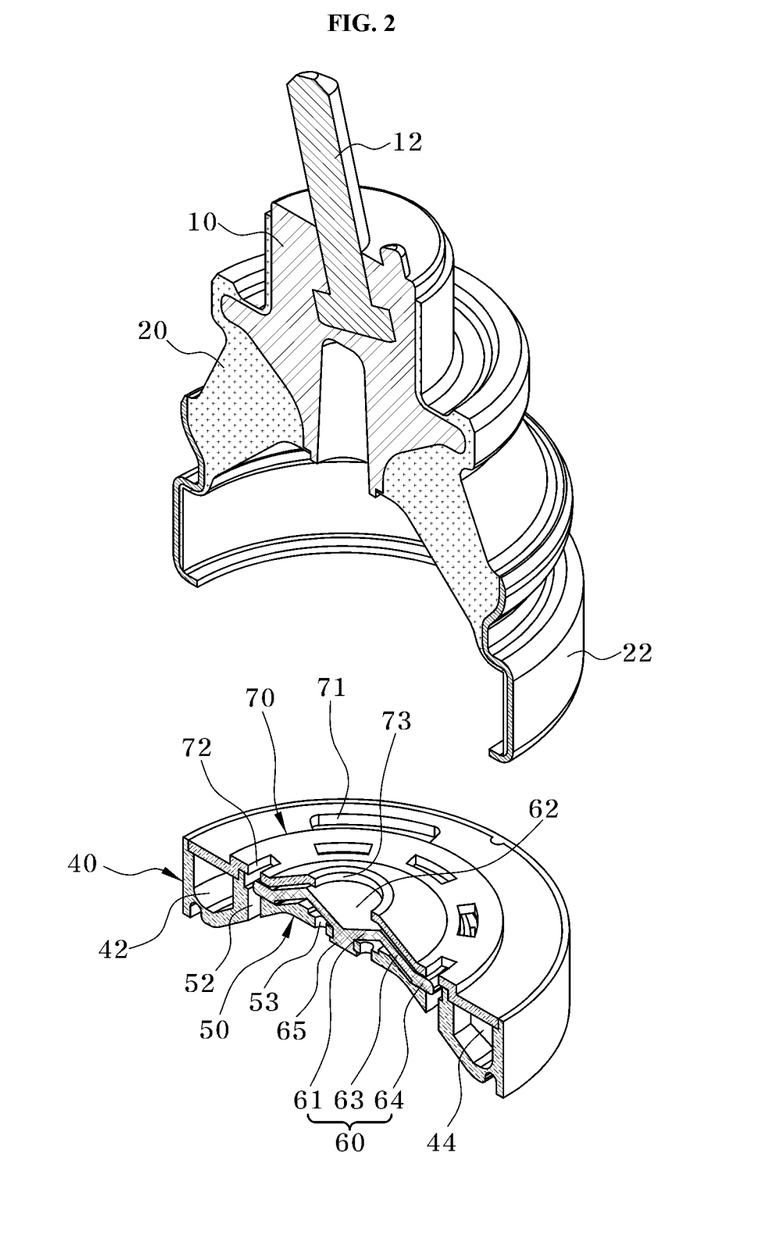
Figure 3:
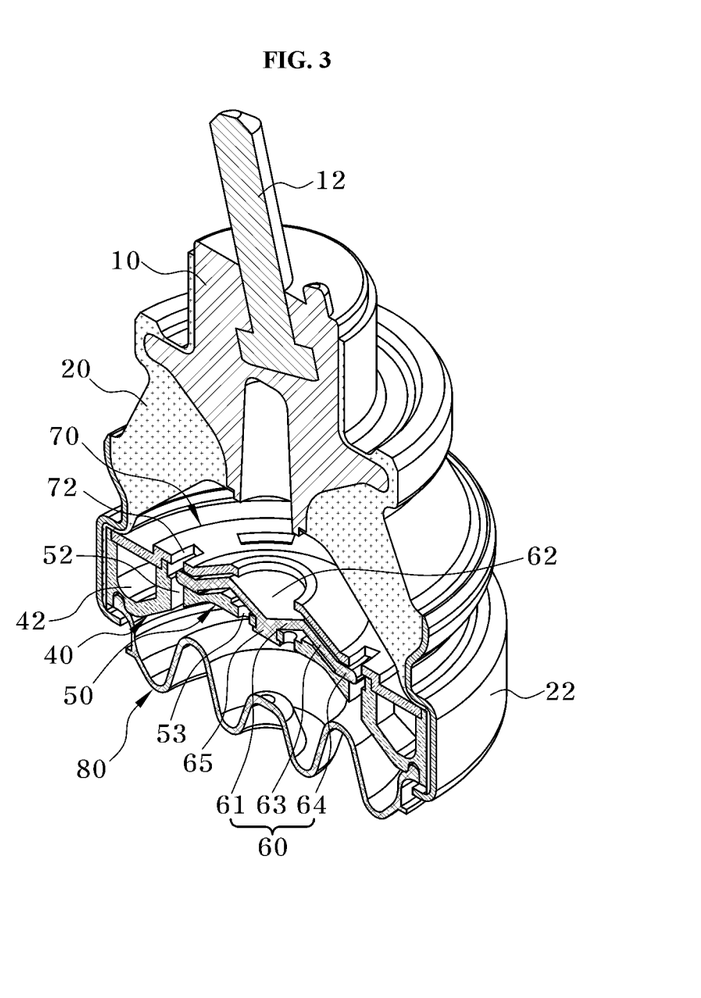
Figure 4:
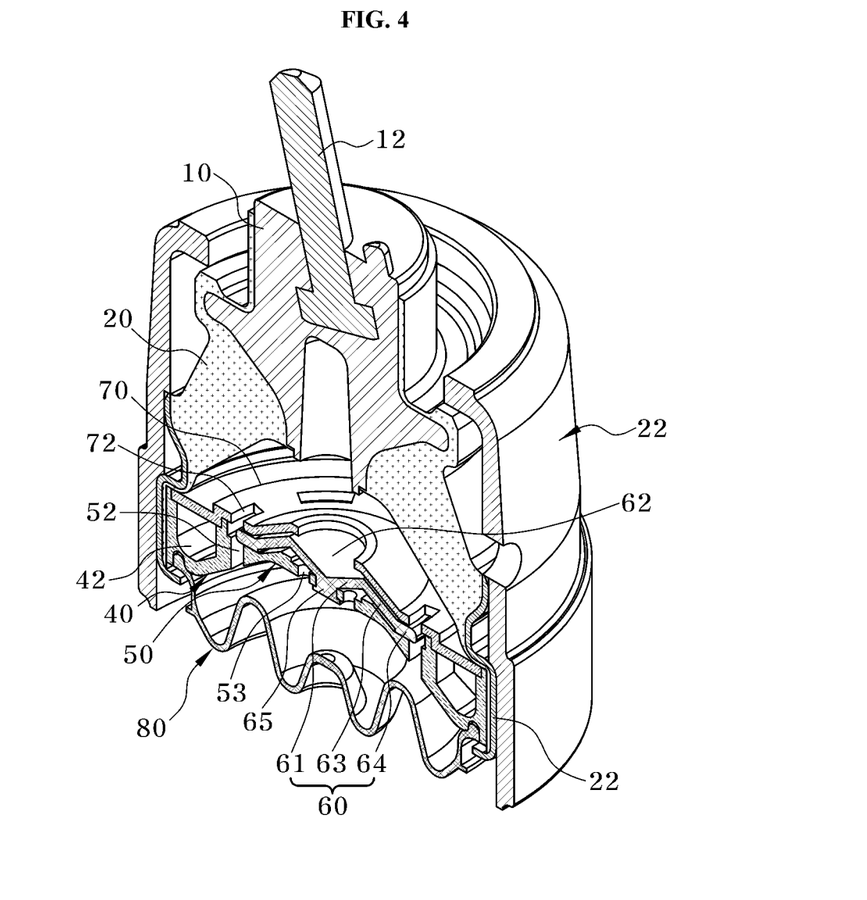
Figure 5:
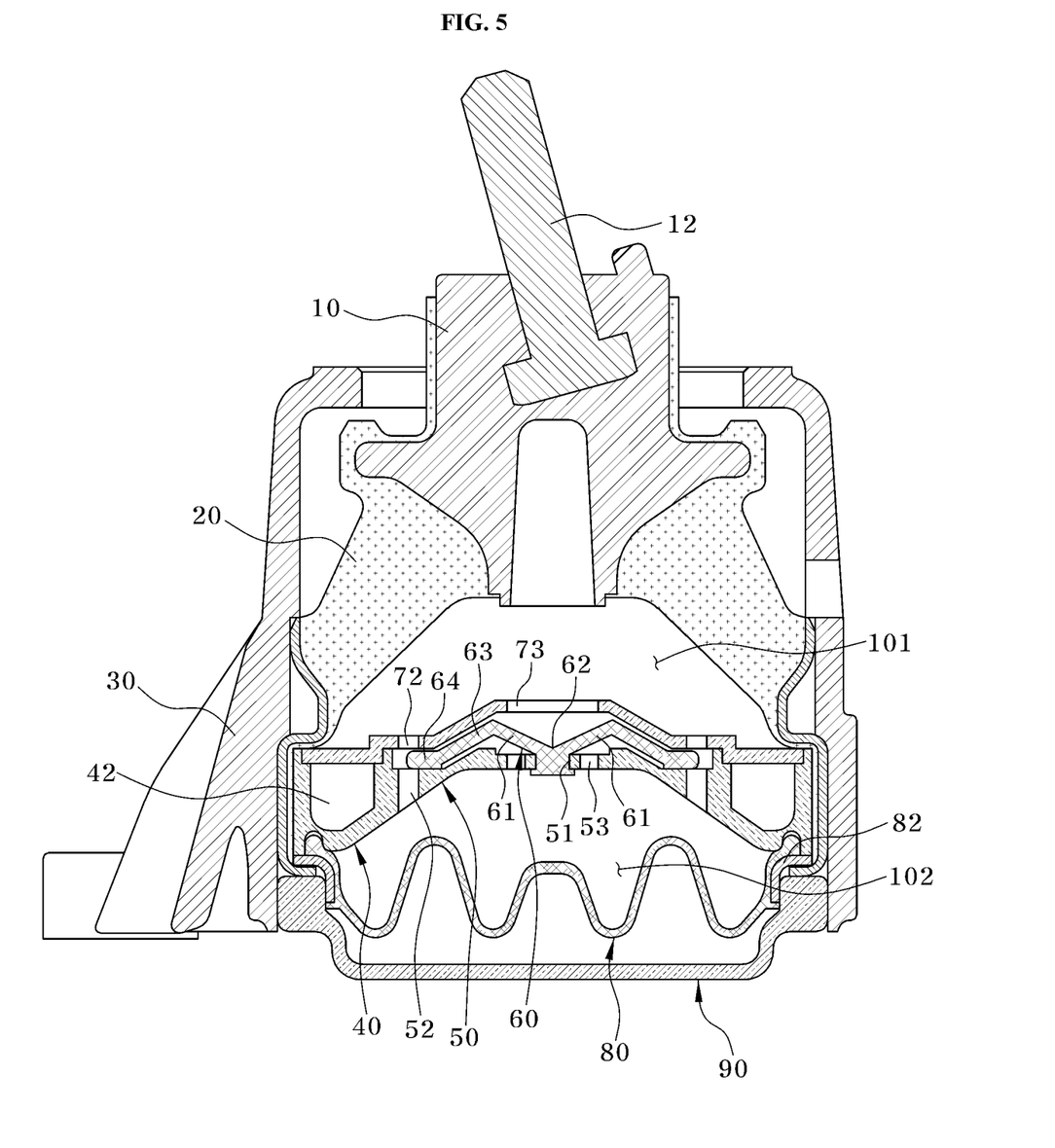
FIG. 5 shows a cross-sectional view illustrating an exemplary finally assembled state of an exemplary engine mount for a vehicle according to an exemplary embodiment of the present invention.

FIGS. 1 to 4 show exemplary engine mounts for a vehicle according to exemplary embodiments of the present invention and exemplary assembly processes thereof. FIG. 5 is a cross-sectional view illustrating an exemplary finally assembled state of an exemplary engine mount for a vehicle according to an exemplary embodiment of the present invention.

As illustrated in FIGS. 2 to 5, a bolt 12 for coupling to a vehicle body may be coupled to the metal core bush 10, which serves as a framework of the engine mount, and the core bush 10 may be provided on the outer peripheral portion thereof with a main rubber 20 through curing adhesion or the like for absorption of vibration.

An outer metal pipe 22 may be further attached to the outer surface of the lower portion of the main rubber 20 through curing adhesion. The outer pipe 22 may extend downwards so as to provide a mounting space for an orifice body 40.

The outer pipe 22 may be provided therein with the orifice body 40 having a lower plate 50 integrally formed therewith, an upper plate 70 placed on the orifice body 40 and coupled thereto, and a membrane 60 disposed between the lower plate 50 and the upper plate 70, all of which are assembled with one another.

The orifice body 40, which is configured to have a circular ring shape, may be provided at a circumference thereof with a main flow path 42 for fluid communication between an upper fluid chamber 101 and a lower fluid chamber 102. The orifice body 40 may be provided at a predetermined location on the bottom surface thereof with a second fluid passage hole 44, which communicates with the lower fluid chamber 102. The orifice body 40 may be mounted to the inner surface of the outer pipe 22.

The lower plate 50 may be integrally formed with the inner surface of the orifice body 40.

For example, the lower plate 50 may be provided therein with a plurality of second fluid bypass holes 52, which are circumferentially arranged at the outer peripheral portion of the lower plate 50 at regular intervals, and may be integrally formed with the inner surface of the orifice body 40.

Furthermore, the lower plate 50 may be provided in the center thereof with a coupling hole 51, into which a coupling protrusion 65 of the membrane 60 is forcibly fitted, and may be provided around the coupling hole 51 with fluid discharge holes 53 to allow the fluid present between the membrane 60 and the lower plate 50 to be discharged therethrough when the membrane 60 is deformed downwards.

Particularly, because the space between the membrane 60 and the lower plate 60 is also filled with the fluid before the membrane 60 is elastically deformed radially downwards, the fluid present in the space between the membrane 60 and the lower plate 50 must be discharged in order to allow the membrane 60 to be easily and elastically deformed radially downwards.

To this end, since fluid discharge holes 53 are formed in the lower plate 50 around the coupling hole 51, it is possible to allow the fluid present in the space between the membrane 60 and the lower plate 50 to be easily discharged to the lower fluid chamber 102 when the membrane 60 undergoes downward and radial compressional deformation.

By fitting the coupling protrusion 65 of the membrane 60 into the coupling hole 51 in the lower plate 50 and then coupling the upper plate 70 to the orifice body 40, the membrane 60 may be disposed in the space between the lower plate 50 and the upper plate 70 so as to be elastically deformed vertically and radially.

To this end, the upper plate 70, which is composed of a circular plate, may have a single first fluid passage hole 71 for communication with the main flow path in the orifice body 40, a first fluid bypass hole 72 formed in the inner peripheral portion thereof so as to communicate with the second fluid bypass hole 52 in the lower plate 50, and a fluid introduction hole 73 formed in the center of the upper plate 70 so as to introduce the fluid in the upper fluid chamber 101 into a fluid action recess 62 in the membrane 60.

The membrane 60 may have the fluid action recess 62 formed in the center thereof so as to be aligned with the fluid introduction hole 73 in the upper plate 70, and an blocking plate 64 provided at the outer peripheral portion thereof so as to open and close the first fluid bypass hole 72 in the upper plate 70 and the second fluid bypass hole 52 in the lower plate 50. The membrane 60 may be disposed between the lower plate 50 and the upper plate 70 so as to be elastically deformed vertically and radially.

For example, the membrane 60 may include i) a fluid action plate 61 positioned at the center thereof and defining the fluid action recess 62 having a V-shaped cross section, ii) an elastic deformation plate 63, which is integrally formed with the fluid action plate 61 and obliquely extends downwards from the outer periphery thereof, and iii) the blocking plate 64, which is integrally formed with the elastic deformation plate 63 and extends horizontally from the outer periphery of the elastic deformation plate 63 so as to open and close the first fluid bypass holes 72 and the second fluid bypass holes 52. The membrane 60 may be disposed in the space between the lower plate 50 and the upper plate 70 so as to be elastically deformed vertically and radially.

Figure 6:
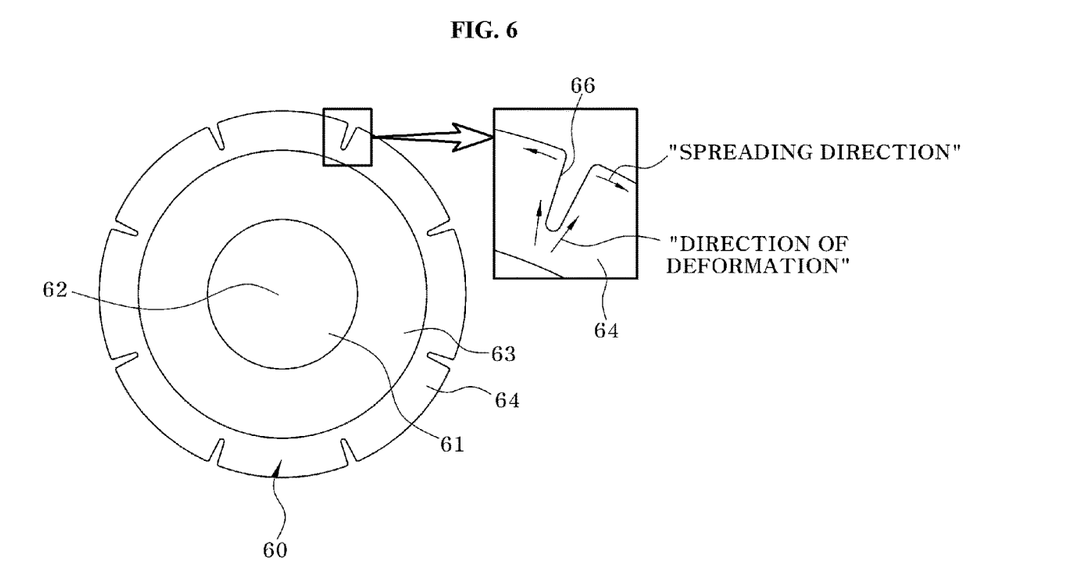
FIG. 6 shows an exemplary plan view illustrating an exemplary membrane of the engine mount for a vehicle according to an exemplary embodiment of the present invention.

Preferably, since the blocking plate 64 of the membrane 60 is provided with a plurality of slits 66, which are circumferentially arranged at regular intervals, such that the outer peripheral portion thereof is enlarged and the slits 66 are broadened when the membrane 60 is elastically deformed radially downwards, it is possible to compensate for the radial elastic deformation of the membrane 60 and to prevent damage to the blocking plate 64, as illustrated in FIG. 6.

Figure 7:
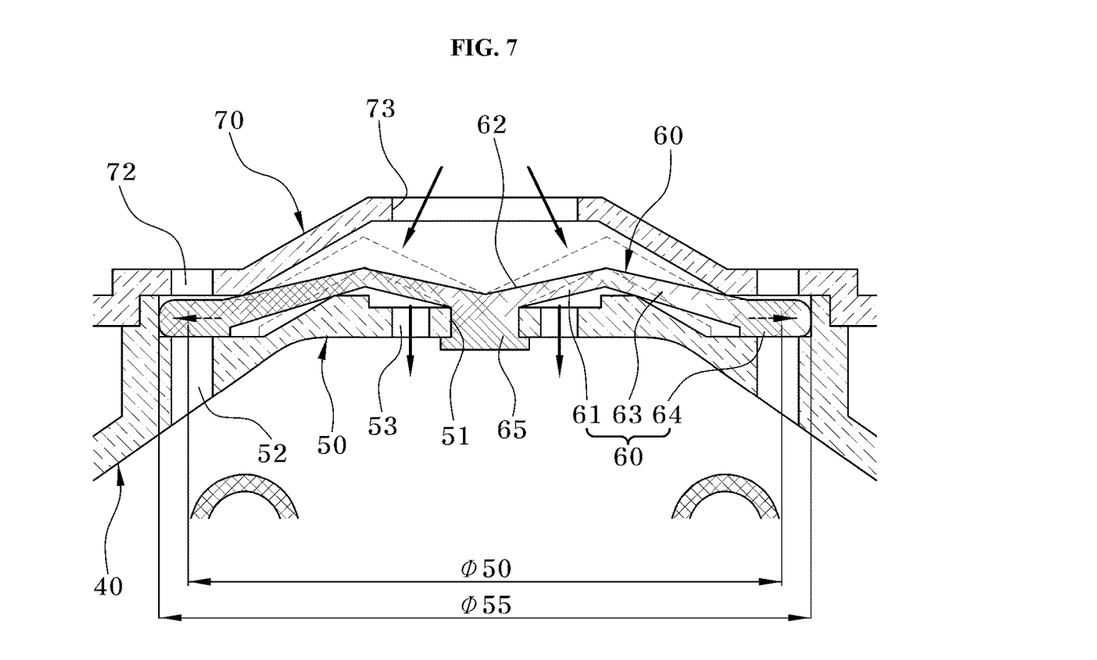
FIG. 7 shows a cross-sectional view illustrating an exemplary membrane of an exemplary engine mount for a vehicle according to an exemplary embodiment of the present invention in an elastically deformed state.

Accordingly, when the fluid from the upper fluid chamber 101 is applied to the fluid action recess 62 in the membrane 60, both the fluid action plate 61 and the elastic deformation plate 63 may be easily deformed downwards while being compressed, and the elastic deformation plate 63 may be easily enlarged radially outwards, as illustrated in FIG. 7.

At the same time, as the blocking plate 64, which is integrally formed at the outer periphery of the elastic deformation plate 63, may be enlarged radially outwards, the blocking plate 64 is moved outwards between the first fluid bypass holes 72 in the upper plate 70 and the second fluid bypass holes 52 in the lower plate 50, thereby blocking the flow of fluid between the first fluid bypass holes 72 and the second fluid bypass holes 52.

For example, since the fluid present in the space between the membrane 60 and the lower plate 50 is discharged to the lower fluid chamber 102 through the fluid discharge holes 53 in the lower plate 50 when the membrane 60 is elastically deformed downwards and radially outwards, the membrane 60 may be elastically compressed and deformed with ease downwards and radially outwards.

Because the coupling protrusion 65 formed on the center of the lower surface of the membrane 60 is forcibly fitted into the coupling hole 51 in the lower plate 50 and is locked thereto, the orbit in which the membrane 60 may be elastically deformed downwards and radially outwards is maintained constant.

A diaphragm 80 may be attached to the lower portion of the orifice body 40 so as to define the lower fluid chamber 102.

Preferably, because the diaphragm 80 is configured to have a corrugated shape, there may be a need to reinforce the rigidity required to maintain the corrugated shape. For example, a rigidity-reinforcing metal plate 82 may be attached to the outer peripheral surface of the diaphragm 80 in order to reinforce the rigidity of the diaphragm 80.

The upper fluid chamber 101 is defined as the space between the main rubber 20 and the upper plate 70, and the lower fluid chamber 102 is defined as the space between the orifice body 40 and the lower plate 50 and the diaphragm 80.

A bracket 30 for coupling to the engine may be mounted on the outer surfaces of the main rubber 20 and the outer pipe 22, and a cup-shaped cover body 90 for protecting the diaphragm 80 may be mounted in the lower opening in the bracket 30.

The engine mount according to an exemplary embodiment of the present invention, which is constructed as described above, will now be described with regard to the operation thereof.

Figure 8:
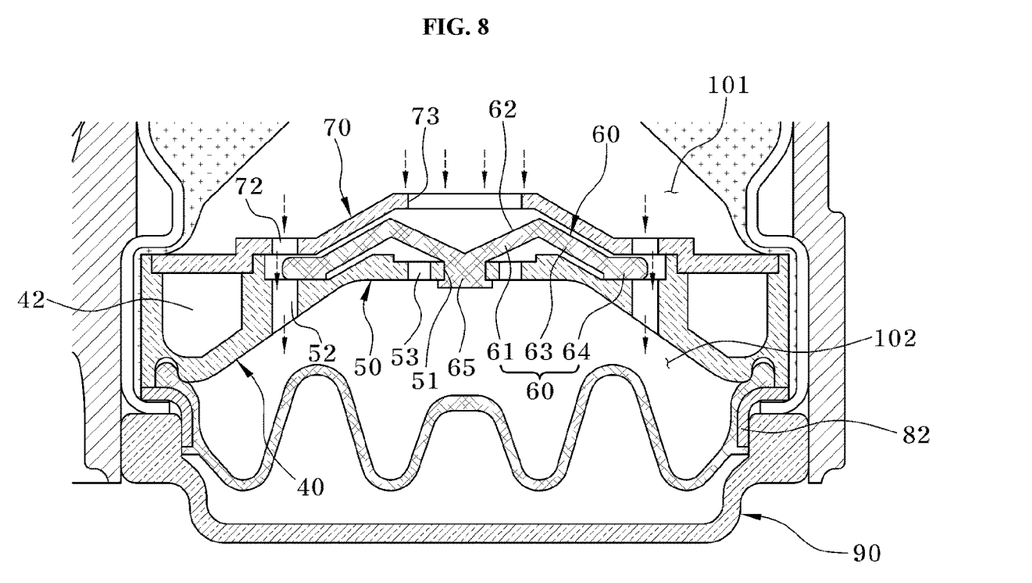
FIG. 8 shows a fragmentary and enlarged cross-sectional view illustrating an exemplary operation of an exemplary engine mount according to an exemplary embodiment of the present invention during idling of the engine.
Figure 9:
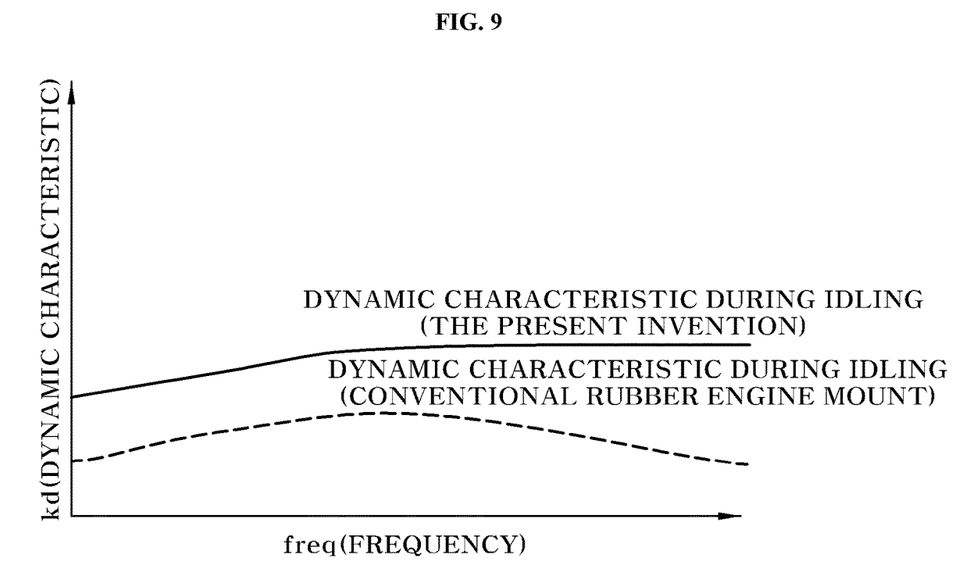
FIG. 9 is a graph illustrating the dynamic characteristic of an exemplary engine mount according to an exemplary embodiment of the present invention during idling of the engine.

FIG. 8 is a fragmentary and enlarged cross-sectional view illustrating the operation of the engine mount according to the embodiment of the present invention during idling of the engine. FIG. 9 is a graph illustrating the dynamic characteristic of the engine mount according to the embodiment of the present invention during idling of the engine.

When vibration of a vehicle during idling or micro vibration of the vehicle due to traveling on a road in good condition is applied to the engine mount, the main rubber 20 may absorb the micro vibration, and the membrane 60 merely may undergo vertical and radial fine deformation (less than about ±1 mm) even when the fluid in the upper fluid chamber 101 acts on the fluid action recess 62.

The dynamic characteristic of the engine mount according to an exemplary embodiment of the present invention is similar to that of a conventional rubber engine mount, as can be appreciated from the graph in FIG. 9.

For example, when micro vibration including vibrations during idling is applied to the engine mount, the membrane 60 may maintain almost the same shape as the initial shape thereof because the membrane 60 undergoes only fine deformation (less than about ±1 mm) vertically and radially. Consequently, the blocking plate 64 of the membrane 60 cannot be moved to the position between the first fluid bypass holes 72 in the upper plate 70 and the second fluid bypass holes 52 in the lower plate 50.

Accordingly, since the first fluid bypass holes 72 become aligned with the second fluid bypass holes 52 and thus communicate therewith, the fluid in the upper fluid chamber 101 may flow into the lower fluid chamber 102 through the first fluid bypass holes 72 and the second fluid bypass holes 52 while absorbing the micro vibration together with the main rubber 20, as indicated by arrows in FIG. 8.

Figure 10:
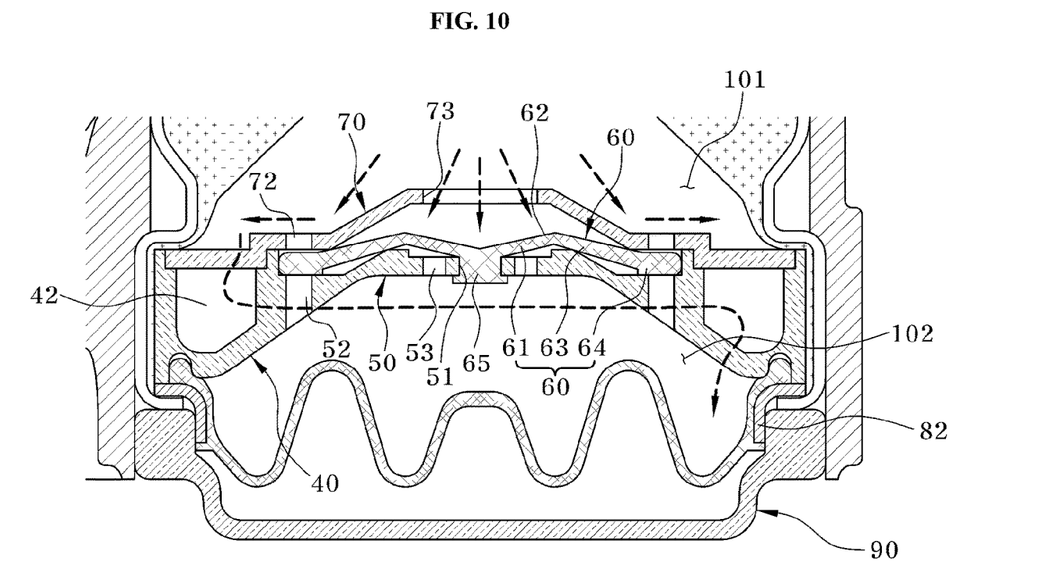
FIGS. 10 and 11 show fragmentary enlarged cross-sectional views illustrating exemplary damping operation of the engine mount according to exemplary embodiments of the present invention during traveling.
Figure 11:
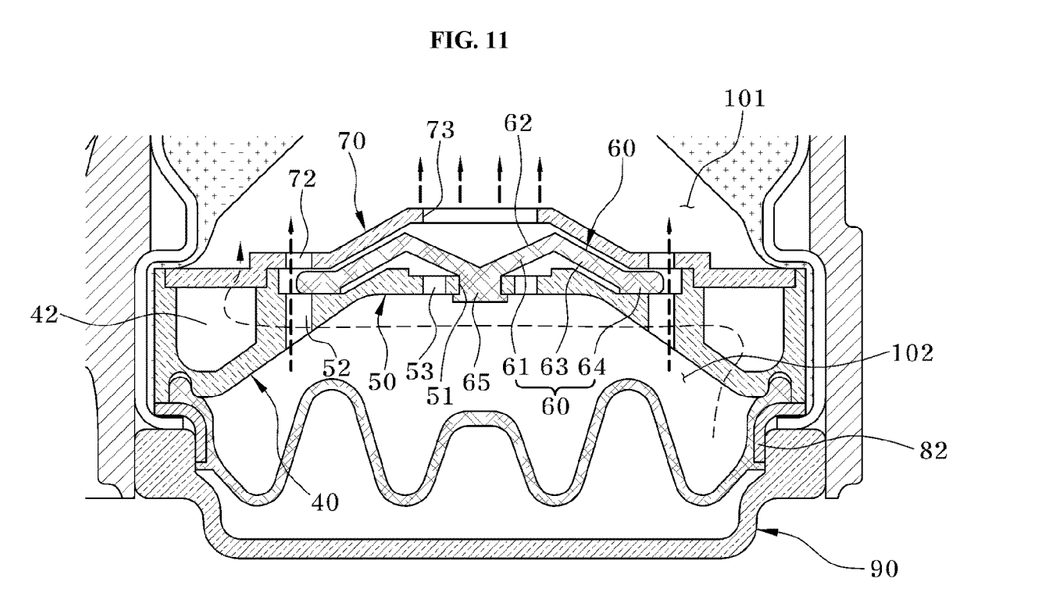
Figure 12:
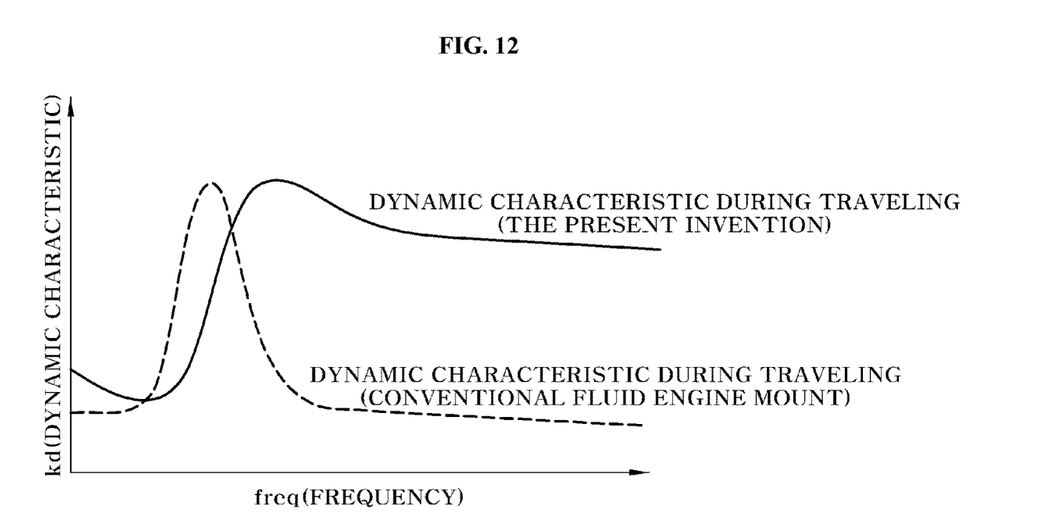
FIG. 12 is a graph illustrating the dynamic characteristic of an exemplary engine mount according to an exemplary embodiment of the present invention in the damping operation during traveling.

FIGS. 10 and 11 are fragmentary enlarged cross-sectional views illustrating exemplary damping operation of exemplary engine mounts according to an exemplary embodiments of the present invention during traveling. FIG. 12 is a graph illustrating an exemplary dynamic characteristic of an exemplary engine mount according to the an exemplary embodiment of the present invention in the damping operation during traveling.

When a large vibration due to traveling on a rough road is applied to the engine mount, the fluid in the upper fluid chamber 101 may be applied to the fluid action recess 62 in the membrane 60 through the fluid introduction hole 73 in the upper plate 70 while the main rubber 20 may be compressed while absorbing the vibration.

Subsequently, as the membrane 60 may be elastically deformed (for example, ±1 mm or more) radially downwards by the pressure of the fluid acting on the fluid action recess 62, the membrane 60 may close the first fluid bypass holes 72 in the upper plate 70 and the second fluid bypass holes 52 in the lower plate 50, whereby fluid communication between the upper fluid chamber 101 and the lower fluid chamber 102 is implemented through the main flow path 42 in the orifice body 40.

For example, when the fluid from the upper fluid chamber 101 may be applied to the fluid action recess 62 in the membrane 60, the fluid action plate 61 and the elastic deformation plate 63 of the membrane 60 may be compressed and deformed downwards while the elastic deformation plate 63 may be deformed and enlarged radially outwards. Subsequently, the blocking plate 64, which is integrally formed with the outer peripheral portion of the elastic deformation plate 63, may also be pushed radially outwards, and may be moved to the position between the first fluid bypass holes 72 in the upper plate 70 and the second fluid bypass holes 52 in the lower plate 50, thereby blocking the flow of fluid between the first fluid bypass holes 72 and the second fluid bypass holes 52. Consequently, fluid communication between the upper fluid chamber 101 and the lower fluid chamber 102 may be implemented through the main flow path 42 in the orifice body 40.

Consequently, since the fluid in the upper fluid chamber 101 flows along the main flow path 42 in the orifice body 40 through the fluid passage hole 71 in the upper plate 70 and is introduced into the lower fluid chamber 102 through the second fluid passage hole 44 in the orifice body 40, damping of the large (downward) vibration may be implemented, as illustrated in FIG. 10.

Meanwhile, since the fluid in the lower fluid chamber 102 flows along the main flow path 42 in the orifice body 40 through the second fluid passage hole 44 in the orifice body 40, and is introduced into the upper fluid chamber 101 through the fluid passage hole 71 in the upper plate 70, damping of the large (upward) vibration may be implemented.

Preferably, the engine mount according to an exemplary embodiment of the present invention may exhibit a dynamic characteristic equal to or superior to that of a conventional fluid engine mount when traveling on a rough road (large vibration), as can be appreciated from the graph in FIG. 12.

Particularly, when the fluid in the lower fluid chamber 102 moves to the upper fluid chamber 101 along the main flow path 42 in the orifice body 40 to damp the large (upward) vibration, the pressure of the fluid acting on the fluid action recess 62 in the membrane 60 may be released (decreased), and the membrane 60 may be restored to the initial shape thereof by the elastic restoring force thereof.

Consequently, since the blocking plate 64 is moved inwards from the position between the first fluid bypass holes 72 and the second fluid bypass holes 52, the first fluid bypass holes 72 may communicate with the second fluid bypass holes 52, as illustrated in FIG. 11.

Accordingly, when the core bush 10 and the main rubber 20 are instantaneously raised for damping of large (upward) vibration, thereby creating a negative pressure in the upper fluid chamber 101, the negative pressure may be quickly released because the first fluid bypass holes 72 communicate with the second fluid bypass holes 52, and the fluid in the lower fluid chamber 102 may flow to the upper fluid chamber 101 through the second fluid bypass holes 52 and the first fluid bypass holes 72 in that order.

Hence, because the negative pressure created in the upper fluid chamber 101 is released, it is possible to prevent the conventional cavitation phenomenon in which air bubbles in fluid burst due to the negative pressure. Furthermore, since the membrane 60 is firmly secured to the lower plate 50 by means of the coupling protrusion 65 thereof, and the blocking plate 64 escapes from the position between the first fluid bypass holes 72 and the second fluid bypass holes 52, thereby minimizing the contact with the fluid, it is possible to prevent the rattling phenomenon due to the flowing speed of the fluid, and it is thus possible to prevent the generation of abnormal noise attributable to the cavitation and the rattling phenomena.

By virtue of the above-described constructions, the present invention provides the following effects.

Since the membrane itself is deformed vertically and radially depending on the input amplitude and the direction of fluid action, it is possible to prevent the cavitation phenomenon and the rattling phenomenon attributable to severe vibration of the membrane by suppressing the creation of negative pressure in the upper fluid chamber, and it is thus possible to prevent the generation of abnormal noise attributable to the cavitation and rattling phenomena.

Further, since the dynamic characteristic of the membrane part of the integral plate is switched in a self-switchable manner depending on whether a vehicle is idling or traveling, it is possible to easily fulfill a damping function of the engine mount for isolating vibration occurring at a powertrain while idling or for controlling the behavior of the powertrain while traveling.

The invention has been described in detail with reference to various exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An engine mount for a vehicle comprising:
    a main rubber formed on an outer surface of a core bush to be assembled with a vehicle body;
    an outer pipe attached to an outer surface of the main rubber and extending downwards;
    an orifice body, which is provided at a circumference thereof with a main flow path for fluid communication between an upper fluid chamber and a lower fluid chamber and which is provided in a bottom surface thereof with a second passage hole, the orifice body being mounted on an inner surface of the outer pipe;
    a lower plate comprising a second fluid bypass hole formed in an outer peripheral portion thereof and integrally formed at an inner periphery of the orifice body;
    an upper plate, which comprises a first fluid passage hole formed in an outer peripheral portion thereof so as to communicate with the main flow path, a first fluid bypass hole configured to communicate with the second fluid bypass hole, and a fluid introduction hole formed in a center region thereof, the upper plate being coupled to an upper portion of the orifice body;
    a membrane, which comprises a fluid action recess configured to be aligned with the fluid introduction hole and which has a blocking plate configured to open and close the first fluid bypass hole and the second fluid bypass hole, the membrane being disposed in a space between the lower plate and the upper plate so as to be elastically deformed in a radial direction; and
    a diaphragm mounted on a lower portion of the orifice body so as to define the lower fluid chamber.

2. The engine mount of claim 1, wherein the membrane comprises:
    a fluid action plate, defining the fluid action recess having a V-shaped cross section;
    an elastic deformation plate, integrally formed with the fluid action plate and obliquely extending downwards from an outer periphery of the fluid action plate; and
    the blocking plate, integrally formed with the elastic deformation plate and extending horizontally from an outer periphery of the elastic deformation plate so as to open and close the first fluid bypass hole and the second fluid bypass hole.

3. The engine mount of claim 2, wherein the blocking plate of the membrane comprises a plurality of slits, which are circumferentially arranged at regular intervals.

4. The engine mount of claim 1, wherein the membrane comprises a coupling protrusion formed at a lower surface of a center thereof, and the lower plate has a coupling hole formed in a center thereof, the coupling protrusion being fitted into the coupling hole.

5. The engine mount of claim 1, wherein the lower plate comprises a fluid discharge hole formed outside the coupling hole such that fluid present between the membrane and the lower plate is discharged through the fluid discharge hole when the membrane is elastically deformed downwards.

6. The engine mount of claim 1, wherein the upper fluid chamber is defined as a space between the main rubber and the upper plate, and the lower fluid chamber is defined as a space between the orifice body, the lower plate, and the diaphragm.

7. The engine mount of claim 1, wherein, when micro vibration including vibration during idling of the vehicle is applied to the engine mount, fluid communication between the upper fluid chamber and the lower fluid chamber is implemented through the first fluid bypass hole in the upper plate and the second fluid bypass hole in the lower plate, which communicate with each other, while the membrane maintains an initial shape thereof.

8. The engine mount of claim 1, wherein, when large vibration due to traveling of the vehicle is applied to the engine mount, fluid in the upper fluid chamber acts on the fluid action recess in the membrane through the fluid introduction hole in the upper plate, and the membrane is elastically deformed radially downwards so as to close the first fluid bypass hole in the upper plate and the second fluid bypass hole in the lower plate, whereby fluid communication between the upper fluid chamber and the lower fluid chamber is implemented through the main flow path in the orifice body.

9. The engine mount of claim 1, wherein a peripheral portion of the diaphragm is provided on an outer surface thereof with a rigidity-reinforcing plate attached thereto so as to reinforce rigidity of the diaphragm.

10. The engine mount of claim 1, wherein a bracket to be connected to an engine is mounted on outer surfaces of the main rubber and the outer pipe.

11. The engine mount of claim 10, wherein a cover body is mounted in a lower opening in the bracket so as to cover a lower portion of the diaphragm.

\* \* \* \* \*